(12) United States Patent
Liu et al.

(10) Patent No.: US 11,532,955 B2
(45) Date of Patent: Dec. 20, 2022

(54) CHARGING MODULE AND WIRELESS CHARGING SYSTEM

(71) Applicant: Halo Microelectronics Co., Ltd., Foshan (CN)

(72) Inventors: Ying Liu, Foshan (CN); Songnan Yang, Frisco, TX (US)

(73) Assignee: Halo Microelectronics Co., Ltd., Foshan (CN)

( * ) Notice: Subject to any disclaimer, the term of this patent is extended or adjusted under 35 U.S.C. 154(b) by 0 days.

(21) Appl. No.: 17/678,589

(22) Filed: Feb. 23, 2022

(65) Prior Publication Data

US 2022/0278555 A1 Sep. 1, 2022

(30) Foreign Application Priority Data

Feb. 26, 2021 (CN) ......................... 202110217797.0

(51) Int. Cl.
*H02J 50/12* (2016.01)
*H02J 50/80* (2016.01)
*H02M 7/04* (2006.01)
*H02M 7/217* (2006.01)

(52) U.S. Cl.
CPC .............. *H02J 50/12* (2016.02); *H02J 50/80* (2016.02); *H02M 7/05* (2021.05); *H02M 7/217* (2013.01)

(58) Field of Classification Search
CPC .. H02J 50/12; H02J 50/80; H02J 50/20; H02J 50/402; H02M 7/05; H02M 7/217; H02M 3/015; H02M 3/33576
See application file for complete search history.

(56) References Cited

U.S. PATENT DOCUMENTS

| 2012/0038218 | A1 | 2/2012 | Ichikawa | |
|---|---|---|---|---|
| 2014/0035383 | A1* | 2/2014 | Riehl | H02J 50/402 |
| | | | | 307/104 |
| 2015/0115727 | A1* | 4/2015 | Carobolante | H04B 5/0075 |
| | | | | 307/104 |
| 2018/0048185 | A1* | 2/2018 | Hwang | H02J 50/12 |
| 2018/0083487 | A1* | 3/2018 | Nalbant | H02J 7/00308 |
| 2018/0212469 | A1* | 7/2018 | Liu | H02J 50/80 |

FOREIGN PATENT DOCUMENTS

| CN | 103580300 | A | | 2/2014 | |
|---|---|---|---|---|---|
| CN | 105790318 | A | | 7/2016 | |
| CN | 107431384 | A | | 12/2017 | |
| CN | 108400657 | A | | 8/2018 | |
| CN | 112018907 | A | * | 12/2020 | ............ H01F 38/14 |
| CN | 112018907 | A | | 12/2020 | |

* cited by examiner

*Primary Examiner* — Pinping Sun
(74) *Attorney, Agent, or Firm* — Slater Matsil, LLP

(57) ABSTRACT

A charging module includes a low-frequency resonant unit, a high-frequency resonant unit, a first capacitor, a rectifier unit and a voltage conversion unit. The low-frequency resonant unit comprises a low-frequency coil and a low-frequency compensation capacitor connected in series. The high-frequency resonant unit comprises a high-frequency coil and a high-frequency tuning capacitor connected in series. The high-frequency tuning capacitor is used to make the difference between the AC voltage between two terminals of the high-frequency resonant unit when receiving high-frequency wireless power signals and the induced electromotive force between two terminals of the low-frequency coil generated by the current flowing through the high-frequency resonant unit is within a preset interval.

19 Claims, 14 Drawing Sheets

US 11,532,955 B2

CHARGING MODULE AND WIRELESS CHARGING SYSTEM

PRIORITY CLAIM

This application claims the benefit of and priority to Chinese Patent Application No. 202110217797.0, filed Feb. 26, 2021, which is hereby incorporated by reference in its entirety.

TECHNICAL FIELD

The invention is related to the technical field of wireless charging, especially a charging module and wireless charging system.

BACKGROUND

With the development of smart phones, wireless charging has gradually become a standard feature of high-end mobile phones. Currently, wireless charging transmitter solutions based on the low frequency (110-148.5 kHz) Qi standard are most common. The wireless charging transmitter based on the Qi standard is usually composed of one or more coils. During the charging process, the mobile phone needs to be closely attached to the transmitter and precisely aligned with a coil in the transmitter to achieve efficient wireless power transmission. Once the distance between the mobile phone and the wireless charging transmitter increases or the alignment is incorrect, wireless charging cannot proceed smoothly.

The system using the high-frequency wireless charging standard Airfuel Alliance (AFA) can increase the charging distance and the placement freedom within the charging plane by increasing the operating frequency to 6.78 MHz, and provide customers with the next generation of wireless charging user experience. For this reason, high frequency (MHz) wireless charging solutions are always considered as second-generation device wireless charging solutions, and are also regarded the evolution direction of the market. While the wireless charging system is evolving from the low-frequency Qi standard to the high-frequency AFA standard, since the equipment based on the Qi standard already has a large user base, a dual-mode solution with both low-frequency and high-frequency solutions is required as a transition to make the evolution of the product easier to be accepted by end users.

In the existing dual-mode receiver system, the two receiving coils are connected to the same rectifier circuit supporting high-frequency and low-frequency dual-mode operation through a high-frequency and a low-frequency tuning and compensation circuits respectively, that is, connected to the AC input terminal of the rectifier circuit. The advantage of this structure is to reuse the rectifier circuit, thereby saving cost.

However, in the existing dual-mode receiver system, due to the coupling between the high-frequency coil and the low-frequency coil, the power transmission efficiency of the wireless charging system is reduced. In other words, the power transfer efficiency of the existing dual-mode receiver system is low.

SUMMARY

The present invention aims to provide a charging module and a wireless charging system, which can improve the efficiency of the dual-mode wireless charging receiver.

In order to achieve the foregoing objectives, in a first aspect, the present invention provides a charging module applied to a dual-mode wireless charging receiver, the charging module includes a low-frequency resonant unit, a high-frequency resonant unit, a first capacitor, a rectifier unit, and a voltage conversion unit. The first terminal of the low-frequency resonant unit is connected to the first terminal of the high-frequency resonant unit, and the connection node is the first connection node. The second terminal of the low-frequency resonant unit is connected to the second terminal of the high-frequency resonant unit, and the connection node is the second connection node.

The low-frequency resonant unit includes a low-frequency coil and a low-frequency compensation capacitor connected in series, the high-frequency resonant unit includes a high-frequency coil and a high-frequency tuning capacitor connected in series. The doted terminal of the low-frequency coil is connected to the doted terminal of the high-frequency coil.

The high-frequency tuning capacitor is used to make the difference between the AC voltage between two terminals of the high-frequency resonant unit when receiving high-frequency wireless power signals and the induced electromotive force between two terminals of the low-frequency coil generated by the current flowing through the high-frequency resonant unit is within a preset interval.

The first terminal of the first capacitor is connected to the first connection node. The second terminal of the first capacitor is connected to the first input terminal of the rectifier unit, and the second input terminal of the rectifier unit is connected to the second connection node. The output terminal of the rectifier unit is connected to the input terminal of the voltage conversion unit, and the output terminal of the voltage conversion unit is used to supply power to subsequent circuits.

The first capacitor is used to form a series resonance with the high-frequency coil and the high-frequency tuning capacitor near the operating frequency of the high-frequency wireless power signals.

Optionally, the capacitance value of the high-frequency tuning capacitor is:

$$CH = \frac{LH - k\sqrt{LH \cdot LL}}{\omega^2}$$

CH is the capacitance value of the high-frequency tuning capacitor. LH is the inductance value of the high-frequency coil. LL is the inductance value of the low-frequency coil, and w is the angular frequency of the high-frequency wireless power signal received by the dual-mode wireless charging receiver, and k is the coupling coefficient between the high-frequency coil and the low-frequency coil at the operating frequency of the high-frequency wireless power signals.

Optionally, the capacitance value of the first capacitor is:

$$CC = \frac{CH}{\omega^2 LH \cdot CH - 1}$$

CC is the capacitance value of the first capacitor.

Optionally, the charging module further includes a first switch unit and a control unit. The first switch unit is connected in parallel with the first capacitor, and the first switch unit is connected to the control unit.

Optionally, the control unit is used to detect whether the dual-mode wireless charging receiver receives a low-frequency wireless power signal. If yes, controlling the first switch unit to be turned on, so that the low-frequency resonant unit transfers the received low-frequency wireless power signal to the rectifier unit. If no, controlling the first switch unit to be turned off, so that the first capacitor is used to form a series resonance with the high-frequency coil and the high-frequency tuning capacitor near the operating frequency of the high-frequency wireless power signals.

Optionally, the first switch unit includes a first MOSFET. The gate of the first MOSFET is connected to the control unit, and the drain and source of the first MOSFET are connected to the first terminal and the second terminal of the first capacitor respectively.

The first MOSFET is used to switch its conduction state based on the first control signal of the control unit, where the maximum voltage of the first control signal is regarded as the high level, and the minimum voltage value of the first control signal is regarded as the low level.

Optionally, the first control signal is always at a high level or always at a low level. The first control signal is used to control the conduction state of the first MOSFET based on the wireless power signal received by the dual-mode wireless charging receiver.

Optionally, the first control signal comprises a plurality of levels changing continuously between the high level and the low level. The first control signal is used to change the conduction state of the first MOSFET when the control unit detects an overvoltage or overcurrent event at the input, so as to protect the subsequent circuits.

Optionally, the first control signal is a pulse width modulation signal. The first control signal is used to modulate the on-resistance of the first MOSFET to realize communication with the transmitter in a manner of load modulation.

Optionally, the charging module further includes a low-frequency start unit. The first terminal of the low-frequency start unit is connected to the first terminal of the first switch unit, and the second terminal of the low-frequency start circuit is connected to the output terminal of the rectifier unit. When the charging module is started by receiving the low-frequency wireless power signal through the low-frequency coil, the low-frequency start unit is used to provide power to each unit in the charging module based on the low-frequency wireless power signal received by the low-frequency coil.

Optionally, the low-frequency start unit includes a first diode. The first terminal of the first diode is connected to the first connection node and the first terminal of the first switch unit, and the second terminal of the first diode is connected to the output terminal of the rectifier unit.

Optionally, the low-frequency start unit further includes a second diode. The first terminal of the second diode is grounded, and the second terminal of the second diode is connected to the first terminal of the first diode.

Optionally, the charging module further includes a second switch unit. The second switch unit is connected in parallel with the first capacitor, and the second switch unit comprises at least one second sub-switch unit and at least one second capacitor, where each of the at least one second sub-switch unit corresponds to a second capacitor. The second sub-switch unit is connected in series with the second capacitor.

The second switch unit is used to control the conduction state of the at least one second sub-switch unit based on the second control signal of the control unit, so as to adjust the effective capacitance value of the first capacitor.

Optionally, the second control signal is a digital signal representing the on-off state of the at least one second sub-switch unit. When the dual-mode wireless charging receiver receives a high-frequency wireless power signal, the first control signal controls the first switch unit to remain open, and when the control unit detects that the resonance frequency of the series circuit composed by the high-frequency resonant unit and the first capacitor deviates from the frequency of the input high-frequency wireless power signal, the second control signal is used to change the conduction state of at least one second sub-switch to dynamically tune the series circuit to resonance at the frequency of the input high-frequency wireless power signal.

Optionally, the second control signal is a digital signal representing the on-off state of the at least one second sub-switch unit. When the dual-mode wireless charging receiver receives a low-frequency wireless power signal and performs load modulation communication, the first control signal controls the first switch unit to turn off, and the second control signal is used to change the conduction state of at least one second sub-switch unit to realize the communication between the dual-mode wireless charging receiver and the transmitter by changing the effective capacitance value of the first capacitor.

Optionally, the first switch unit includes a first MOSFET. The gate of the first MOSFET is connected to the control unit, and the drain and source of the first MOSFET are connected to the first terminal and the second terminal of the first capacitor respectively.

The second sub-switch unit includes a second MOSFET. The drain of the second MOSFET is connected to the first terminal of the second capacitor. The second terminal of the second capacitor is connected to the first terminal of the first capacitor, and the source of the second MOSFET is connected to the second terminal of the second capacitor. The gate of the second MOSFET is connected to the control unit.

Optionally, the rectifier unit includes a third MOSFET, a fourth MOSFET, a fifth MOSFET, and a sixth MOSFET. The connection node between the source of the third MOSFET and the drain of the fourth MOSFET is connected to the second terminal of the first capacitor, and the connection node between the source of the fifth MOSFET and the drain of the sixth MOSFET is connected to the second connection node. The drain of the third MOSFET is connected to the drain of the fifth MOSFET, and is connected to the output terminal of the rectifier unit. The source of the fourth MOSFET and the source of the sixth MOSFET are both grounded. The gate terminals of the third MOSFET, fourth MOSFET, fifth MOSFET and sixth MOSFET are all connected to the control unit.

Optionally, the rectifier unit includes a seventh MOSFET and an eighth MOSFET. The connection node between the source of the seventh MOSFET and the drain of the eighth MOSFET is connected to the second connection node, and the drain of the seventh MOSFET is connected to the output terminal of the rectifier unit. The source of the eighth MOSFET and the second terminal of the first capacitor are both grounded, and the gate of the seventh MOSFET and the gate of the eighth MOSFET are both connected to the control unit.

Optionally, the charging module further includes a detection unit. The detection unit is connected to the rectifier unit and the control unit respectively. The detection unit is used to detect the frequency of the wireless power signal received by the rectifier unit of dual-mode wireless charging receiver, and transmit the detection result to the control unit.

In a second aspect, the present invention also provides a wireless charging system. The wireless charging system includes a dual-mode wireless charging receiver. The dual-mode wireless charging receiver includes the charging module as described above, and the dual-mode wireless charging receiver is used to be set in an electronic device.

The transmitter is configured to supply power to the dual-mode wireless charging receiver when it comes within a preset range of the dual-mode wireless charging receiver, and the transmitter is configured to be set in a power supply device.

The beneficial effects of the embodiments of the present invention are: the charging module provided by the present invention includes a low frequency resonant unit, a high frequency resonant unit, a first capacitor, a rectifier unit, and a voltage conversion unit. The first terminal of the low frequency resonant unit and the first terminal of the high frequency resonant unit are connected, and the connection node is the first connection node. The second terminal of the low-frequency resonant unit is connected to the second terminal of the high-frequency resonant unit, and the connection node is the second connection node. The low-frequency resonant unit includes a low-frequency coil and a low-frequency compensation capacitor connected in series. The high-frequency resonant unit includes a high-frequency coil and a high-frequency tuning capacitor connected in series. The doted terminal of the low-frequency coil is connected to the doted terminal of the high-frequency coil.

The high-frequency tuning capacitor is used to make the difference between the AC voltage between two terminals of the high-frequency resonant unit when receiving high-frequency wireless power signals and the induced electromotive force between two terminals of the low-frequency coil generated by the current flowing through the high-frequency resonant unit is within a preset interval. The first terminal of the first capacitor and the first connection node are connected. The second terminal of the first capacitor is connected to the first input terminal of the rectifier unit. The second input terminal of the rectifier unit is connected to the second connection node, and the output terminal of the rectifier unit is connected to the input terminal of the voltage conversion unit. The output terminal of the voltage conversion unit is used to supply power to the subsequent circuits. The first capacitor is used to make the high-frequency coil and the high-frequency tuning capacitor form a series resonance near the operating frequency of high-frequency wireless power signal. Through the above method, the efficiency of the dual-mode wireless charging receiver can be improved.

BRIEF DESCRIPTION OF THE DRAWINGS

One or more embodiments are exemplified by the figures in the corresponding drawings. These exemplified descriptions do not constitute a limitation on the embodiments. The elements with the same reference numerals in the drawings are denoted as similar elements. Unless otherwise stated, the figures in the attached drawings do not constitute a scale limitation.

DETAILED DESCRIPTION OF ILLUSTRATIVE EMBODIMENTS

In order to make the objective, technical solutions, and advantages of the embodiments of the present application clearer, the following will clearly and completely describe the technical solutions in the embodiments of the present application with reference to the drawings in the embodiments of the present application. Obviously, the described embodiments are a part of the embodiments of the present invention, but not all of the embodiments. Based on the embodiments of the present invention, all other embodiments obtained by those with ordinary skill in the art without creative work shall fall within the protection scope of the present invention.

Figure 1:
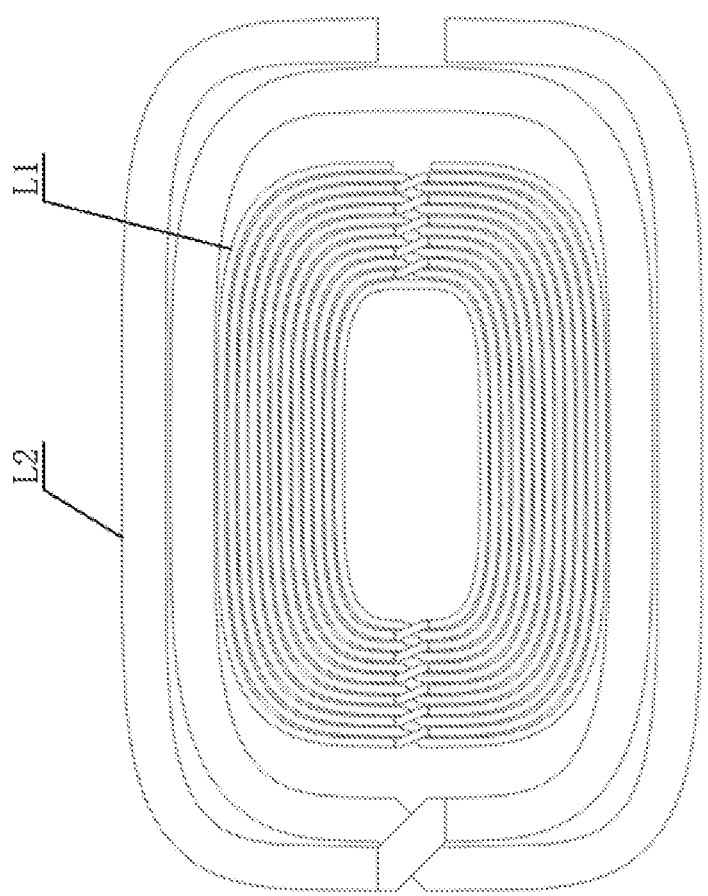
FIG. 1 is a schematic structural diagram of a high-frequency coil and a low-frequency coil in prior art.

Please refer to FIG. 1, which is a schematic structural diagram of a common high-frequency coil and a low-frequency coil in prior art. As shown in FIG. 1, collocated high-frequency coil and low-frequency coils usually adopt a concentric structure, in which the high-frequency coil L2 is sleeved on the outside of the low-frequency coil L1, and the respective ports of the two coils are located at the disconnected point on the right side of the coil and are connected to the charging module through their respective ports.

Figure 2:
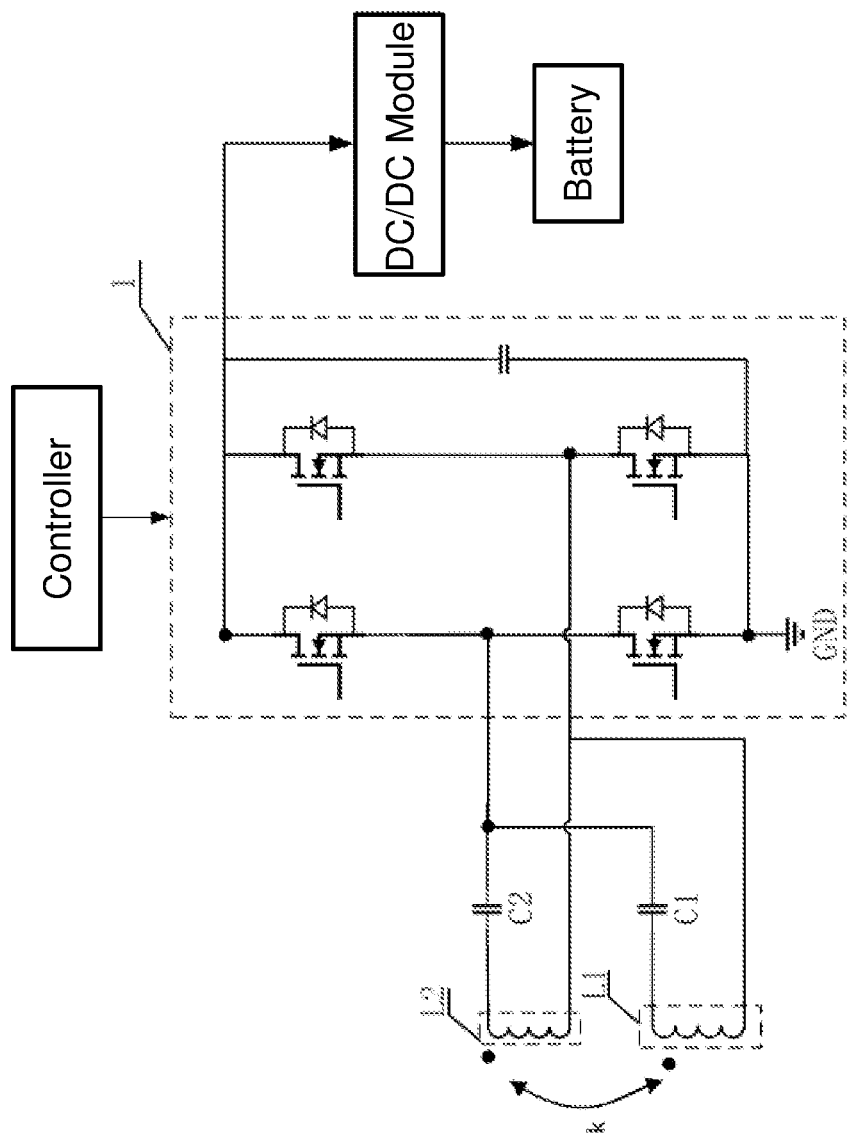
FIG. 2 is a schematic structural diagram of a dual-mode wireless charging receiving terminal in prior art.

Applying the above structure to the dual-mode wireless charging receiver in the prior art, as shown in FIG. 2, the low-frequency coil L1 and the high-frequency coil L2 are connected in parallel with the rectifier circuit 1 through compensation capacitor C1 and the tuning capacitor C2.

When the dual-mode wireless charging receiver is receiving low-frequency (500 KHz and below) wireless power signals, since the capacitance of the tuning capacitor C2 is less than a few nF, it is approximately open at the low-frequency wireless charging operating frequency. Therefore, even if there is a coupling between the concentric coils, no significant low-frequency current can be generated on the high-frequency coil L2, so it will not affect the low-frequency operation of the system.

When the dual-mode wireless charging receiver is receiving high-frequency (6.78 MHz or above) wireless power signals, the rectifier circuit 1 outputs electric energy to the load. During the charging process, the equivalent load can be very small (for example, only a few Ohms), then equivalent to the low-frequency coil L1, there will be a small equivalent resistance in series with the low-frequency coil L1 and the compensation capacitor C1 to form a current loop. Therefore, the electromotive force on the low-frequency coil L1 induced by the current on the high-frequency coil L2 will generate a relatively small current on the low-frequency coil L1.

Figure 3:
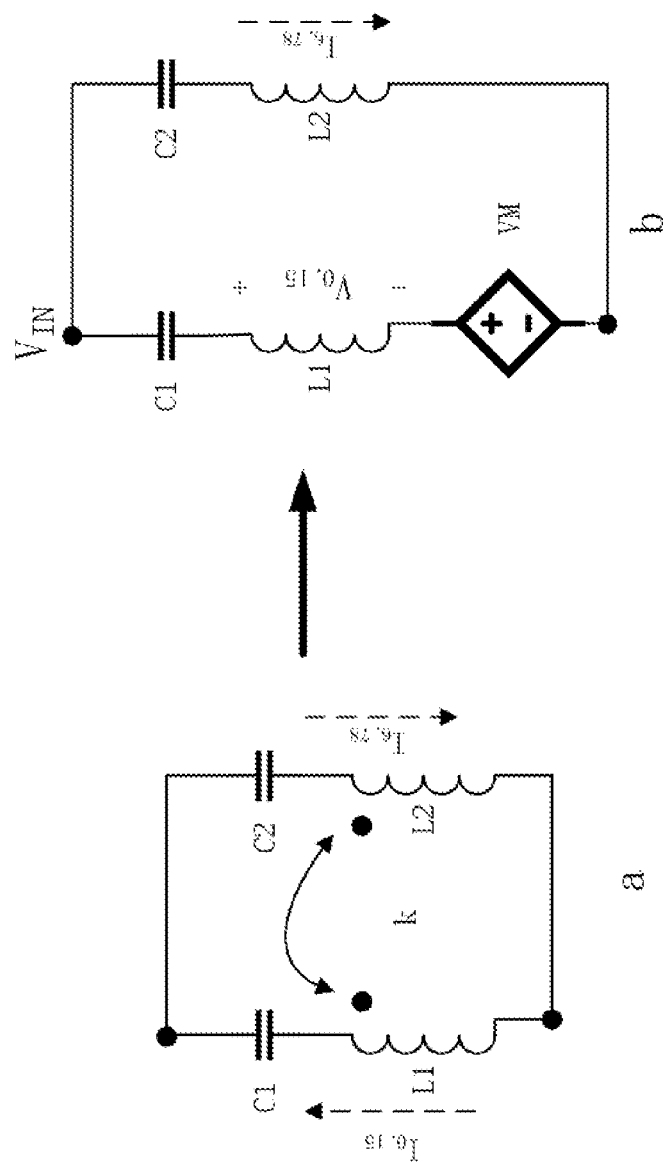
FIG. 3 is an equivalent circuit schematic diagram of a partial structure of a dual-mode wireless charging receiver in prior art.

As shown in FIG. 3, FIG. 3a shows the equivalent circuit diagram of the low-frequency coil L1, the high-frequency coil L2, the compensation capacitor C1 and the tuning capacitor C2 when the dual-mode wireless charging receiver shown in FIG. 2 is operating to receive wireless power signal at high frequency (6.78 MHz or above). Among them, the current $I_{6.78}$ is the current flowing through the high-frequency coil L2, and the current $I_{0.15}$ is the current generated on the low-frequency coil L1 by the electromotive force induced by the current $I_{6.78}$ on the low-frequency coil L1. Since the winding directions of the high and low frequency coils are the same, the directions of the currents $I_{0.15}$ and $I_{6.78}$ are opposite. Traditional high-frequency tuning and low-frequency compensation capacitor designs will try to resonate the high-frequency coil and low-frequency coil near the high-frequency and low-frequency wireless power signal's operating frequencies, respectively. However, due to the arrangement of the concentric coils, the coupling coefficient k between the coils is relatively strong. When two coils and their corresponding tuning and compensation capacitors are connected in parallel to the input of the rectifier circuit and receiving high-frequency wireless power signals, the decoupled equivalent circuit is shown in in FIG. 3b, where VM is the electromotive force induced by the current I2 on the low-frequency coil L1.

Then the VM can be expressed as:

$$VM = j\omega M \cdot I_{6.78} = j\omega k \sqrt{LH \cdot LL} \cdot I_{6.78}$$

where k is the coupling coefficient between the high-frequency coil and the low-frequency coil, ω is the angular frequency of high-frequency wireless power signal, LH is the inductance of the high-frequency coil L2, LL is the inductance of the low-frequency coil L1, and M is mutual inductance between the low-frequency coil and the high-frequency coil.

At the same time, the voltage $V_{IN}$ (i.e. the rectifier input voltage) across the series circuit of the high-frequency coil L2 and the high-frequency tuning capacitor C2 can be expressed as:

$$V_{IN} = \left(j\omega LH + \frac{1}{j\omega CH}\right) \cdot I_{6.78}$$

where CH is the capacitance value of the high-frequency tuning capacitor C2. The low-frequency coil L1 is in series with the low-frequency compensation capacitor C1 and then connected in parallel with the input of the rectifier. The low-frequency compensation capacitor is approximately short at high frequency. The voltage $V_{0.15}$ across the low-frequency coil L1 can be expressed as:

$$V_{0.15} \cong V_{IN} - VM.$$

In summary, in prior art, the high-frequency receiving coil and the tuning capacitor resonate near the high-frequency operating frequency, that is, $V_{IN}$ is equal to zero. When the dual-mode wireless charging receiver is operating at high frequency (6.78 MHz or above), the electromotive force induced by the current $I_{6.78}$ on the low-frequency coil L1 is $V_{0.15}$ which is approximately equal to −VM. At this time, it is not zero, so the low-frequency coil L1 will inevitably generate a high-frequency current $I_{0.15}$ opposite to $I_{6.78}$. Due to the existence of the induced current $I_{0.15}$ on the low-frequency coil L1, the equivalent inductance value of the high-frequency coil L2 will decrease at high frequencies, and the coupling with the high-frequency transmitter will also decrease. The AC resistance (ACR) of high-frequency coil L2 will also increase due to the existence of the low-frequency coil L1. The equivalent quality factor Q of the corresponding high-frequency coil L2 will also decrease, and the power transfer efficiency of the high-frequency system will also decrease.

Based on this, the present invention provides a charging module, which can improve the efficiency of the dual-mode wireless charging receiver when receiving high-frequency wireless power signals.

Figure 4:
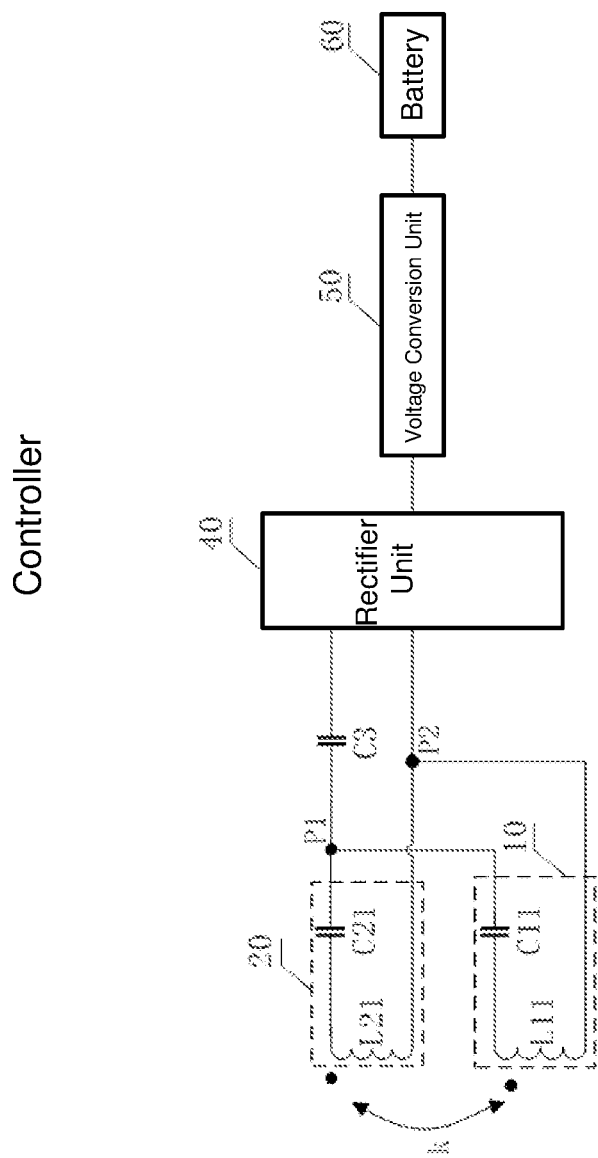
FIG. 4 is a schematic structural diagram of a charging module provided by an embodiment of the present invention.

As shown in FIG. 4, the charging module includes a low-frequency resonant unit 10, a high-frequency resonant unit 20, a first capacitor C3, a rectifier unit 40 and a voltage conversion unit 50.

Specifically, the first terminal of the low-frequency resonant unit 10 and the first terminal of the high-frequency resonant unit 20 are connected to the first connection node P1, and the second terminal of the low-frequency resonant unit 10 and the second terminal of the high-frequency resonant unit 20 are connected to the second connection node P2. The first terminal of the first capacitor C3 is connected to the first connection node P1. The second terminal of the first capacitor C3 is connected to the first input terminal of the rectifier unit 40. The second input terminal of the rectifier unit 40 is connected to the second connection node P2. The output terminal of the rectifier unit 40 is connected with the input terminal of the voltage conversion unit 50, and the output terminal of the voltage conversion unit 50 is used to supply power to the battery 60 and/or subsequent devices.

Figure 5:
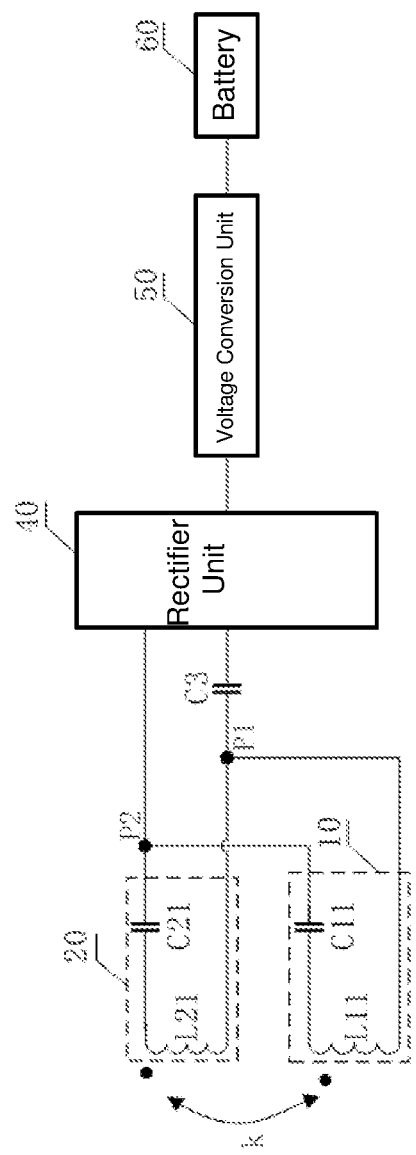
FIG. 5 is a schematic structural diagram of a charging module provided by another embodiment of the present invention.

It should be understood that for the two connection nodes between the low-frequency resonant unit 10 and the high-frequency resonant unit 20, one of the connection nodes can be arbitrarily defined as the first connection node P1, and the rest connection node is the second connection node P2. For example, the first connection node P1 and the second connection node P2 may be located as shown in FIG. 4. In another embodiment, the first connection node P1 and the second connection node P2 may also be located as shown in FIG. 5.

Referring to FIG. 4 again, the low-frequency resonant unit 10 includes a low-frequency coil L11 and a low-frequency compensation capacitor C11 connected in series. The high-frequency resonant unit 20 includes a high-frequency coil L21 and a high-frequency tuning capacitor C21 connected in series, and the doted terminal of the low-frequency coil L11 is connected to the doted terminal of the high-frequency coil L21.

The high-frequency tuning capacitor C21 is used to make the difference between the AC voltage (the voltage between P1 and P2) between two terminals of the high-frequency resonant unit 20 when receiving high-frequency wireless power signals and the induced electromotive force between two terminals of the low-frequency coil L11 generated by the current flowing through the high-frequency resonant unit 20 are within a preset interval.

It can be seen from the above prior art that $V_{0.15}$ is the difference between the AC voltage $V_{IN}$ between two terminals of the high-frequency resonant unit 20 and the induced electromotive force VM formed between two terminals of the low-frequency coil L11 by the current flowing through the high-frequency resonant unit 20. The difference $V_{0.15}$ determines the high-frequency current generated on the low-frequency coil L11 when the charging module receives a high-frequency wireless power signal.

Therefore, the present application provides a new high-frequency tuning capacitor C21, which no longer meets the resonant condition at the high-frequency working frequency with the high-frequency coil L21, but can keep the difference $V_{0.15}$ within a preset interval. Therefore, by controlling the value of $V_{0.15}$, it is possible to control the high-frequency current generated by the low-frequency coil L11.

It should be understood that the preset interval can be set according to actual application conditions, and there is no limitation here. At the same time, with smaller $V_{0.15}$, the lower the high-frequency current generated by the low-frequency coil L11, the higher the operating efficiency of the charging module.

Therefore, in an optimal embodiment, the value of the high-frequency tuning capacitor C21 can be set to make $V_{0.15}$ be zero, so that no high-frequency current will be generated on the low-frequency coil L11. The problem of reduced coupling between the high-frequency coil L21 and the high-frequency transmitting coil and additional loss on the low-frequency coil L11 will not occur. At this time, the power transmission capacity of the system is maximized, and the efficiency is also high.

Therefore, it can be derived from that $V_{0.15}$ is zero. $V_{IN}$ is equal to VM, and the following formula can be obtained:

$$j\omega LH + \frac{1}{j\omega CH} = j\omega k\sqrt{LH \cdot LL}$$

where CH is the capacitance value of the high-frequency tuning capacitor C21, LH is the inductance value of the high-frequency coil L21, LL is the inductance value of the low-frequency coil L11, and w is the angular frequency of the high-frequency wireless power signal received by the dual-mode wireless charging receiver, k is the coupling coefficient between the high-frequency coil L21 and the low-frequency coil L11 at the high-frequency operating frequency. Among them, the high-frequency operating frequency refers to the frequency dual-mode wireless charging receiver is operating at when receiving high-frequency (6.78 MHz or above) wireless power signals. Then the capacitance value of the high-frequency tuning capacitor C21 can be further obtained as:

$$CH = \frac{LH - k\sqrt{LH \cdot LL}}{\omega^2}$$

It can be seen that the capacitance of the new high-frequency tuning capacitor C21 no longer satisfies the condition of forming resonance with the inductance of the high-frequency coil L21 at the high-frequency operating frequency.

In order to further improve the efficiency, the resonance of the inductance of the high-frequency coil L21 needs to be realized. At this time, a new series capacitor needs to be introduced, and the series capacitor is the first capacitor C3.

As shown in FIG. 4 or FIG. 5, the first capacitor C3 is connected in series with the high-frequency coil L21 and the high-frequency tuning capacitor C21. The first capacitor C3, the high-frequency tuning capacitor C21 and the high-frequency coil L21 form a series resonance. At this time, the capacitance value of the first capacitor C3 satisfies the following equation:

$$j\omega LH + \frac{1}{j\omega CH} + \frac{1}{j\omega CC} = 0$$

At the same time, when $V_{0.15}$ is equal to zero, the capacitance value of the first capacitor C3 can be obtained:

$$CC = \frac{CH}{\omega^2 LH \cdot CH - 1}$$

where CC is the capacitance value of the first capacitor C3.

By using the dual-mode wireless charging receiver, there is no current on the low-frequency coil L11, which neither reduces the coupling between the high-frequency coil L21 and the transmitter coil, nor causes losses. The coil L21, the first capacitor C3 and the high-frequency tuning capacitor C21 exhibit series resonance at the high-frequency operating frequency, which can maximize the high-frequency power transmission capacity and efficiency.

When the dual-mode wireless charging receiver receives the low-frequency wireless power signal, the high-frequency tuning capacitor C21 and the high-frequency coil L21 connected in series will show a few nF-level small capacitors at the low frequency, which will not affect the operation of the low-frequency coil L11 and will effectively filter the spurious signals between two terminals of the low-frequency resonant unit 10 (low-frequency coil L11 and low-frequency compensation capacitor C11), and reduce EMI generated by the low-frequency receiving circuit.

However, it should be noted that the capacitance of the first capacitor C3 is less than a few nF levels. When the dual-mode wireless charging receiver is operating at a low frequency, the first capacitor C3 presents high impedance, which will block the current path between the low frequency coil L11 and the rectifier unit 40. To solve this problem, this application continues to introduce a first switch unit. The first switch unit is connected in parallel with the first capacitor C3, and when the control unit 30 detects that the system is receiving a low frequency wireless power signal, the first capacitor C3 is short-circuited to achieve more efficient low-frequency wireless power reception. At the same time, when the system is receiving a high frequency wireless power signal, the first switch unit is controlled to open to achieve more precise tuning of the high frequency coil, so as to improve the efficiency of high frequency power transmission.

Figure 6:
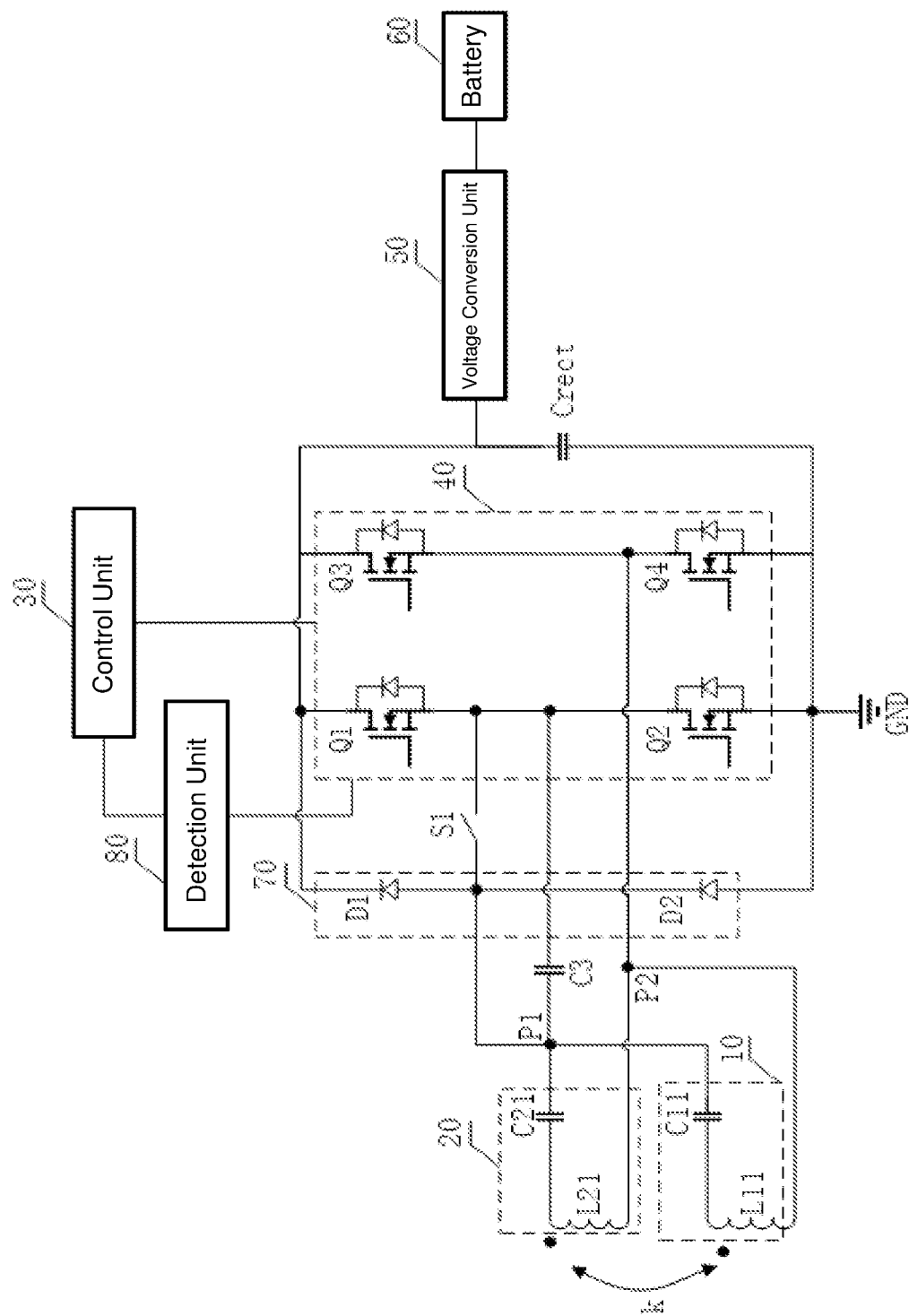
FIG. 6 is a schematic structural diagram of a charging module provided by another embodiment of the present invention.

Take the first connection node P1 and the second connection node P2 shown in FIG. 4 as an example. As shown in FIG. 6, the charging module further includes a first switch unit S1 (corresponding to the above-mentioned first switch unit) and a control unit 30, where the first switch unit S1 is connected in parallel with the first capacitor C3, and the first switch unit S1 is connected with the control unit 30.

When the first switch unit S1 is turned on, the first capacitor C3 is short-circuited. On the contrary, when the first switch unit S1 is turned off, the first capacitor C3 is connected to the charging module.

Among them, the first switch unit S1 can be a single-pole single-throw switch, a relay or a MOSFET. For example, the first switch unit S1 adopts a common way of connecting two MOSFET transistors in series, that is, the sources of the two MOSFETs are connected together, and the two drains serve as the two connection terminals of the switch.

At the same time, in another embodiment, the control unit 30 can detect whether the dual-mode wireless charging receiver receives a low-frequency wireless power signal. If so, it can be seen from the above that the first switch unit S1 needs to be short-circuited at this time. That is, the first switch unit S1 needs to be turned on, so that the low-frequency current induced from the transmitter on the low-frequency coil L11 passes through the turned-on first switch unit, and is rectified by the rectifier unit 40 to supply power to the subsequent circuit.

However, if the control unit 30 detects that the dual-mode wireless charging receiver does not receive the low-frequency wireless power signal, there may be multiple conditions at this time. For example, the control unit 30 detects that the dual-mode wireless charging receiver receives a high-frequency wireless power signal, or the entire charging module is in a sleep state, the control unit 30 does not detect any signal, or the dual-mode wireless charging receiver is done with receiving the low-frequency wireless power signal, the control unit 30 can no longer detect the reception of the low-frequency wireless power signal. In the above-mentioned cases, the first switch unit S1 is controlled to be turned off, that is, the state of the first switch unit S1 being kept open is its initial state and reset state.

When the control unit 30 detects that the dual-mode wireless charging receiver receives a high-frequency wireless power signal, the first capacitor C3 is used to form a series resonance with the high-frequency coil L21 and the high-frequency tuning capacitor C21 near the high-frequency operating frequency. At this time, the high-frequency current induced from the transmitter on the high-frequency coil L21 is connected to the rectifier unit 40 through the first capacitor C3, and then supplies power to the subsequent circuits after the rectifier unit 40.

Among them, in one embodiment, the charging module further includes a detection unit 80. The detection unit 80 is connected to the control unit 30 and the rectifier unit 40 respectively.

Specifically, the detection unit 80 can detect the frequency of the wireless power signal received by the dual-mode wireless charging receiver through the rectifier unit 40 and transmit the detection result to the control unit 30. Therefore, the control unit 30 can know whether the wireless power signal received by the dual-mode wireless charging receiver is a low-frequency wireless power signal.

Figure 7:
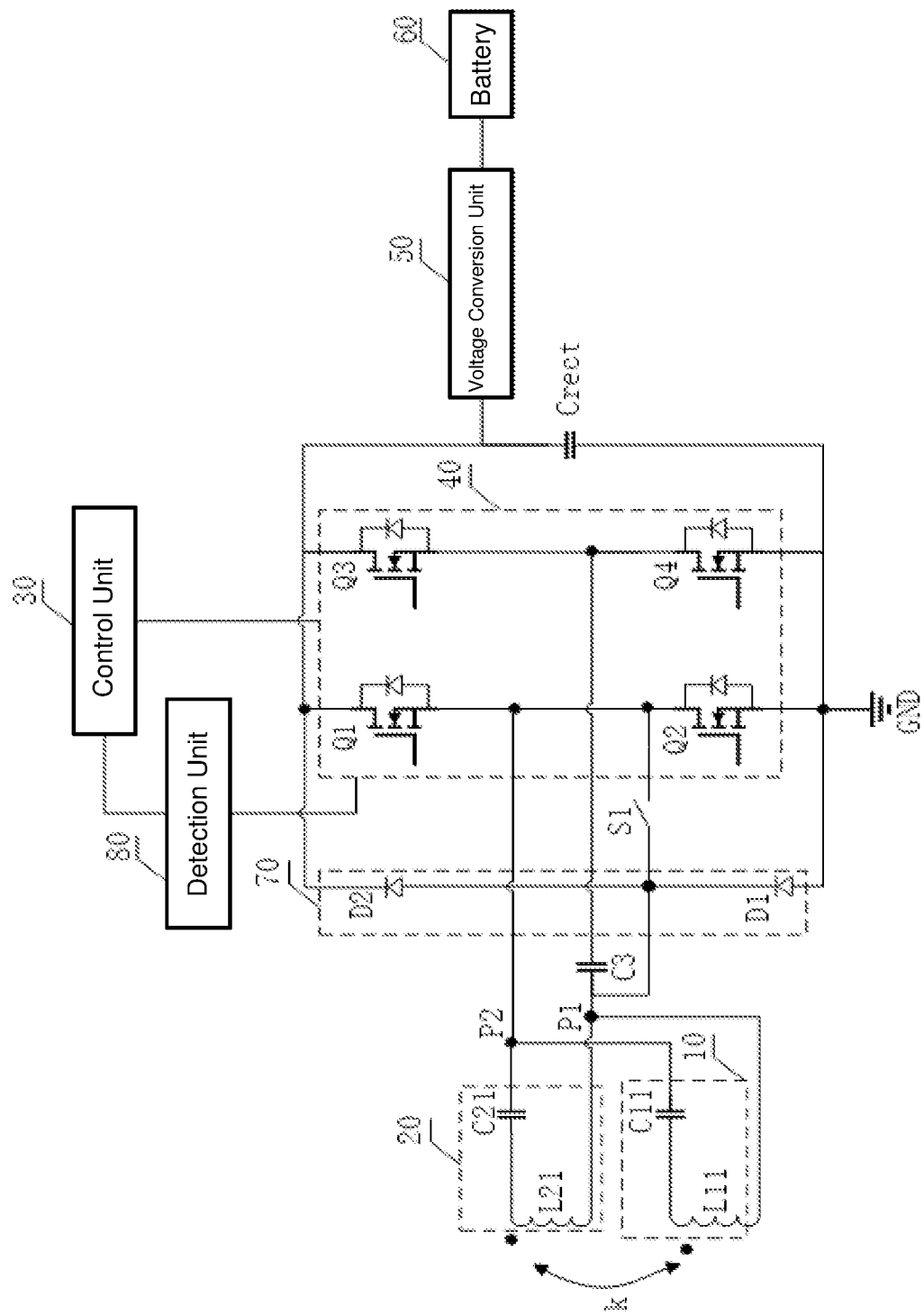
FIG. 7 is a schematic structural diagram of a charging module provided by another embodiment of the present invention.

When the first connection node P1 and the second connection node P2 are configured as shown in FIG. 5, the corresponding position of the first switch unit S1 is as shown in FIG. 7. The actual implementation of the first switch unit S1 is similar to the above-mentioned embodiment, which can be easily understood by a person skilled in this field, and will not be repeated here.

In some embodiments, referring to FIG. 6 again, the charging module further includes a low-frequency start unit 70, and the low-frequency start unit 70 is connected to the first terminal of the first switch unit 51 and the rectifier unit 40 respectively.

Optionally, the low-frequency start unit 70 includes a first diode D1, the anode (first terminal) of the first diode D1 is connected to the first connection node P1 and the first terminal of the first switch unit 51. The cathode (second terminal) of the diode D1 is connected to the output terminal of the rectifier unit 40.

Optionally, the low-frequency start unit 70 further includes a second diode D2. The anode (first terminal) of the second diode D2 is grounded, and the cathode (second terminal) of the second diode D2 is connected to the anode (first terminal) of the first diode D1.

Specifically, when a wireless power signal comes in at the dual-mode wireless charging receiver, the output capacitor Crect needs to be charged through the rectifier unit 40 or the low-frequency start unit 70 to provide power to each unit in the charging module (including the control unit 30, etc.). If the signal received by the dual-mode wireless charging receiver is a low-frequency wireless power signal, at this time, since the first switch unit S1 is in the default off-state (the control unit 30 is not yet powered, the first switch unit S1 cannot be controlled to turn on)), at this time the low-frequency wireless power signal cannot pass through the first capacitor C3 and the rectifier unit 40 to provide operating power for each unit in the charging module because of the first capacitor C3. In other words, each unit in the charging module may not be able to start due to an insufficient power supply voltage.

Then, the low-frequency start unit 70 provides a new circuit for charging the output capacitor Crect to provide power to each unit in the charging module.

Among them, take the case of rectifier unit 40 being a full-bridge rectifier unit as an example. At this time, the rectifier unit 40 includes a third MOSFET, a fourth MOSFET, a fifth MOSFET, and a sixth MOSFET. As shown in FIG. 6, the third MOSFET corresponds to the MOSFET Q1, and the fourth MOSFET corresponds to the MOSFET Q2. The fifth MOSFET corresponds to the MOSFET Q3, and the sixth MOSFET corresponds to the MOSFET Q4.

The connection node between the source of Q1 and the drain of Q2 is connected to the second terminal of the first capacitor C3, and the connection node between the source of Q3 and the drain of Q4 is connected to the second connection node P2. The drain of Q1 is connected to the drain of Q3 and is connected to the output terminal of the rectifier unit 40. The source of Q2 and the source of Q4 are both grounded, and the gate terminals of Q1, Q2, Q3 and Q4 are all connected to the control unit 30.

It should be understood that the rectifier unit 40 may also be a half-bridge rectifier unit.

In summary, the charging module begins to start when receiving the low-frequency wireless power signal through the low-frequency coil L11, and the first switch unit S1 remains off. When the low-frequency current induced from the transmitter on the low-frequency coil L11 is in the positive half cycle (the voltage between the first connection node P1 and the second connection node P2 is positive), and the current flows through a closed circuit formed by the first diode D1 and the body diode of Q4 in the rectifier unit 40 to charge the output capacitor Crect. In the negative half cycle of the low-frequency current (the voltage between the first connection node P1 and the second connection node P2 is negative), the current flows through a closed circuit formed by the second diode D2 and the body diode of Q3 in the rectifier unit 40 to charge the output capacitor Crect. This process is repeated until enough power is accumulated on the output capacitor Crect to start each unit in the charging module (including the control unit 30, etc.). Then, the control unit 30 can perform corresponding operations, for example, further detecting the frequency of the wireless power signal received by the dual-mode wireless charging receiver.

It should be understood that if the system at the output of the dual-mode wireless charging receiver is powered, there is no need to go through the low-frequency start unit 70 to restore and accumulate the initial electrical energy. That is, at this time, as long as the low-frequency wireless power signal input is detected, the control unit 30 can immediately turn on the first switch unit S1.

Of course, the low-frequency start unit 70 may also include only one diode, and its operating process is similar to the above process, which is within the scope that is easily understood by those skilled in the art, and will not be repeated here.

Moreover, when the first connection node P1 and the second connection node P2 are configured as shown in FIG. 7, the corresponding connection relationship between the first diode D1 and the second diode D2 should be as shown in FIG. 7, and will not be repeated here.

In another embodiment, the first switch unit S1 can also be configured as a MOSFET, and the first switch unit S1 includes the first MOSFET. Then, the body diode of the MOSFET can play a role similar to the low-frequency start unit 70, so there is no need to add an additional low-frequency start unit 70 to save cost.

Figure 8:
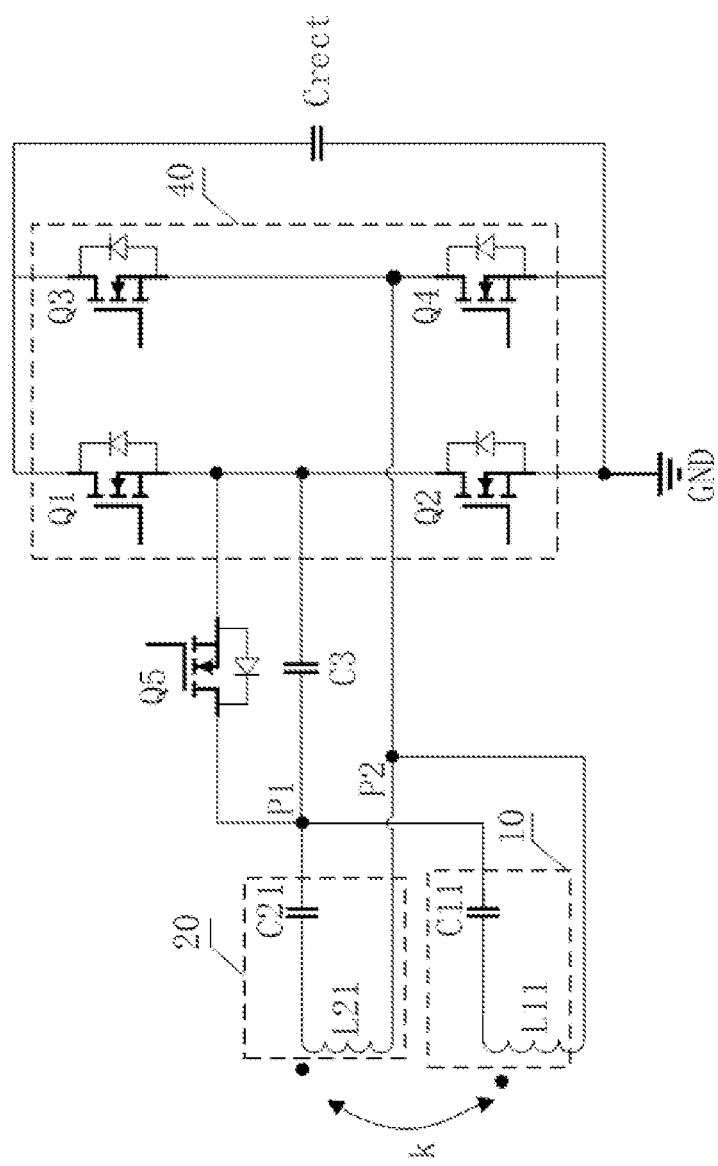
FIG. 8 is a schematic structural diagram of a partial circuit of a charging module provided by an embodiment of the present invention.

Please refer to FIG. 6 and FIG. 8 together, where the first MOSFET corresponds to MOSFET Q5, the gate of Q5 is connected to the control unit 30, and the drain and source of Q5 are connected to the first terminal and the second terminal of capacitor C3 respectively. That is, the drain of Q5 is connected to the first connection node P1. The source of Q5 is connected to the second terminal of the first capacitor C3 that is the first input terminal of the rectifier unit 40.

When the charging module receives the low-frequency wireless power signal through the low-frequency coil L11, and in the negative half cycle of the low-frequency wireless power signal (the voltage between the first connection node P1 and the second connection node P2 is negative), the low-frequency induced current on the low-frequency coil L11 charges the output capacitor Crect through the body diode of Q3 in the rectifier unit 40, and completes the circuit through the body diode of Q2 in the rectifier unit 40 and the body diode of Q5. After the charging module has accumulated sufficient charge and high enough voltage on the output capacitor Crect, each unit in the charging module, such as the control unit 30, is activated.

Then, the control unit 30 is powered on. When the control unit 30 detects that the wireless power signal input from the dual-mode wireless charging receiver is a low-frequency wireless power signal, the control unit 30 will further turn on Q5 to achieve a more effective way to receive low-frequency wireless power. After Q5 is turned on, the first capacitor C3 is effectively short-circuited, and the low-frequency current induced on the low-frequency coil L11 outputs to the rectifier unit 40 through the turned-on Q5, and the control unit 30 drives Q1~Q4 in the rectifier unit 40 at the same time to perform synchronous rectification on the input low-frequency induced current.

When the charging module receives a high-frequency wireless power signal through the high-frequency coil L21, Q5 remains off. The high-frequency induced current on the high-frequency coil L21 outputs to the rectifier unit 40 through the first capacitor C3, and the control unit 30 simultaneously drives Q1 to Q4 in the rectifier unit 40 to perform synchronous rectification on the input high-frequency induced current.

Although Q5 is only one MOSFET, it is different from the two back-to-back MOSFETs used in traditional AC switches (the two MOSFETs are connected in series, that is, the sources of the two MOSFETs are connected, and the two drains are the two connection nodes of the switch). Since the first capacitor C3 is in parallel with Q5, the body diode of Q5 will clamp the voltage across the first capacitor C3.

In the high-frequency steady-state operation, one advantage from blocking of the DC path by the series connected high-frequency tuning capacitor C21 and the low-frequency compensation capacitor C11 is a positive DC voltage from the drain to the source of Q5 will be formed on the first capacitor C3. This positive voltage keeps the body diode of Q5 off. In this way, only one Q5 can effectively block the high-frequency induced current, forcing the high-frequency induced current to form a closed circuit through the first capacitor C3. In this case, Q5 in the off state will not have a significant impact on the effective capacitance value of the first capacitor C3, and the first capacitor C3 can still be connected in series with the high-frequency tuning capacitor C21 and the high-frequency coil L21 to form resonance near the high-frequency operating frequency.

In summary, the application of the first switch unit S1 using a single Q5 can perform the following three different functions in the three different circuit operation states.

First, when the charging module receives a low-frequency wireless power signal through the low-frequency coil L11, the transient response of the body diode of Q5 is used to half-wave rectify the input induced low-frequency current, and the output capacitor Crect is charged to obtain the initial electrical energy for startup control unit 30 or other units.

Second, when the control unit 30 is powered on and detects that the dual-mode wireless charging receiver receives a low-frequency wireless power signal, Q5 is completely turned on during the charging process, and the first capacitor C3 forms an effective short circuit because of a very low on-resistance of Q5 to ensure that the first capacitor C3 will not affect the compensation of the low-frequency coil L21 by the low-frequency compensation capacitor C11.

Third, when the control unit 30 detects that the dual-mode wireless charging receiver receives a low-frequency wireless power signal, the body diode of Q5 is connected in parallel with the first capacitor C3 to clamp the DC voltage on the first capacitor C3 to achieve effective isolation to the high-frequency alternating current using a single MOSFET, thereby ensuring that the first capacitor C3, the high-frequency coil L21 and the high-frequency tuning capacitor C21 form a series resonance near the high-frequency operating frequency.

Furthermore, it can be seen from the above embodiment that the conduction state Q5 is switched based on the first control signal of the control unit 30, where the maximum voltage in the first control signal is regarded as high level, and the minimum voltage of the first control signal is regarded as low level. Then, by providing different first control signals levels to Q5, additional functions can also be realized.

Figure 9:
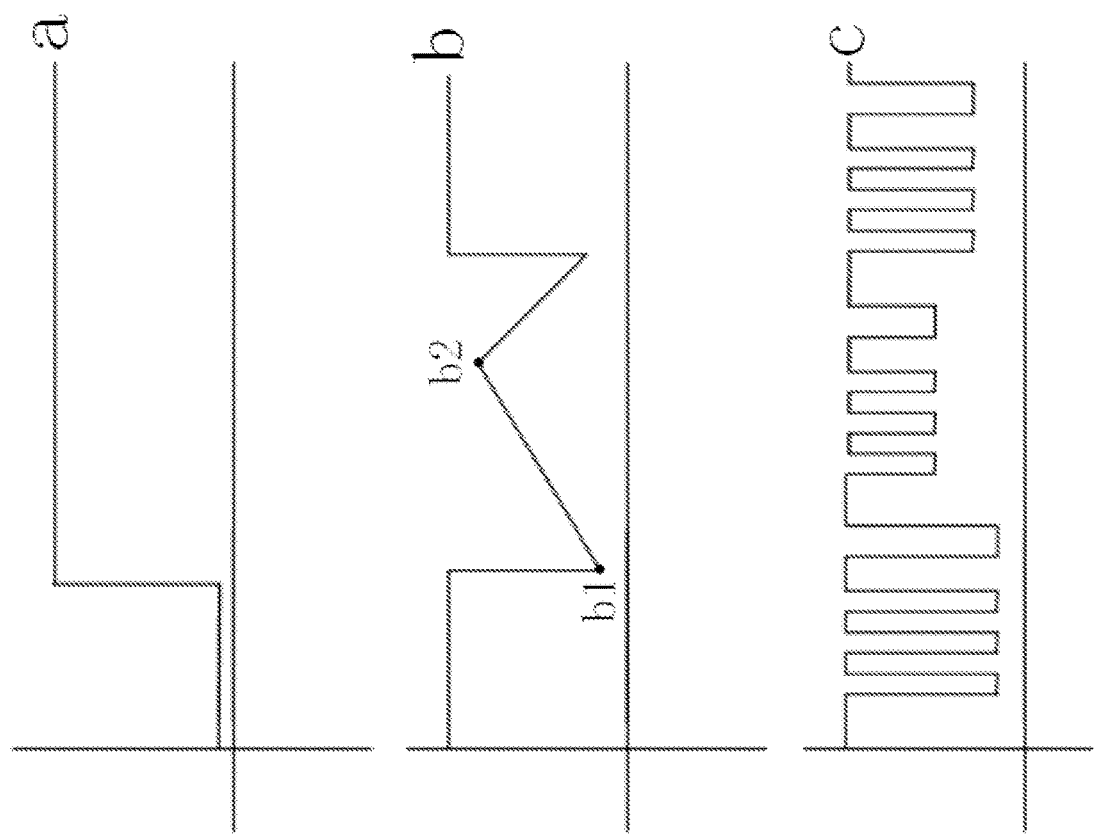
FIG. 9 is a diagram of a first control signal provided by an embodiment of the present invention.

As shown in FIG. 9, a of FIG. 9 indicates that the first control signal is always at a high level, and the high level can be used as a signal for controlling Q5 to remain on. At this time, it can be applied to an application scenario where the control unit 30 detects that the dual-mode wireless charging receiver receives a low-frequency wireless power signal.

Correspondingly, the first control signal can also always be low, which is used as a signal for controlling Q5 to remain off. At this time, it can be applied to a scenario that the control unit 30 detects that the dual-mode wireless charging receiver is not receiving the signal (for example, the control unit 30 detects that the dual-mode wireless charging receiver receives a high-frequency wireless power signal).

In summary, when the first control signal is constantly high or low, the first control signal can control Q5 to be turned on and off based on the wireless power signal received by the dual-mode wireless charging receiver.

The first control signal shown in FIG. 9b is a plurality of levels continuously changing between a high level and a low level. For example, the level at point b1 gradually increases to the level at point b2. In other words, the gate signal of Q5 (that is, the first control signal input) can be a continuously adjustable level between on and off. The first control signal is used to change the conduction state of Q5 when the control unit 30 detects the input overvoltage or overcurrent of the charging module, so as to protect the subsequent circuits.

For example, the control unit 30 detects that the dual-mode wireless charging receiver receives a low-frequency wireless power signal, that is, when working at low frequency, it can work from the on state during normal operation to linear region to increase its on-resistance by reducing the gate voltage of Q5, then realize the voltage division between Q5 and the rectifier unit 40 and the subsequent circuit can be protected.

For another example, the control unit 30 detects that the dual-mode wireless charging receiver receives a high-frequency wireless power signal, that is, during high-frequency operation, it can work from the off state during normal operation to linear region to reduce its on-resistance by increasing the gate voltage of Q5 which can bypass part of the input current so as to protect the subsequent circuit.

The first control signal shown in c of FIG. 9 is represented as a pulse width modulation signal. The first control signal can modulate the on-resistance of Q5 to realize communication with the transmitter in a manner of load modulation.

That is, the gate signal of Q5 is a pulse width modulation signal (PWM signal). When operating at a low frequency, the load modulation is realized by modulating the on-resistance of Q5, to realize the communication with the transmitter through load modulation. At the same time, the amplitude of the pulse width modulation signal can also be adjusted according to the coupling between the transmitter and the dual-mode wireless charging receiver, so as to realize the dynamic adjustment of the modulation depth of the amplitude modulation communication.

In the above embodiment, the operating principle of the circuit in which the first capacitor C3 and the high-frequency tuning capacitor C21 are located on the same side of the high-frequency coil L21 is introduced. Of course, in another embodiment, the first connection node P1 and the second connection node P2 may also be implemented in the manner described in FIG. 10. At this time, the first capacitor C3 and the high-frequency tuning capacitor C21 are arranged on both sides of the high-frequency coil L21. At the same time, the second terminal of the first capacitor C3 is connected to the first input terminal of the rectifier unit 40, and the first terminal of the first capacitor C3 and the low frequency coil L11 are connected to the first connection node P1. Q5 connected in parallel with the first capacitor C3 needs to keep its source connected to the first input terminal of the rectifier unit 40. The drain of Q5 and the common node of the high frequency resonant unit 20 and the low frequency resonant unit 10 (that is, the first connection node P1) are connected.

Figure 10:
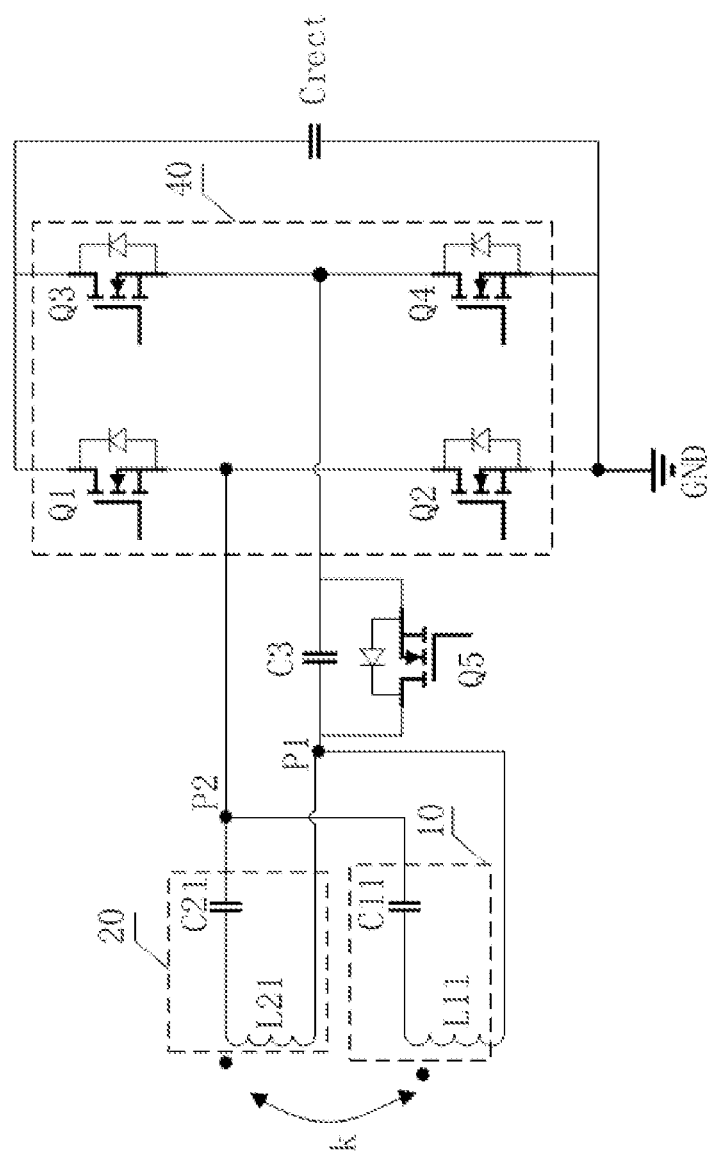
FIG. 10 is a schematic structural diagram of a partial circuit of a charging module provided by another embodiment of the present invention.

It can be understood that the operating principle of the circuit structure shown in FIG. 10 is similar to the operating principle of the circuit structure shown in FIG. 8 and will not be repeated here. However, it should be noted that in the circuit structure shown in FIG. 10, when the low-frequency coil L11 receives the low-frequency wireless power signal, during the positive half cycle of the low-frequency wireless power signal (the voltage between the first connection node P1 and the second connection node P2 is negative), the low-frequency induced current on the low-frequency coil L11 charges the output capacitor Crect through the body diode of Q1 in the rectifier unit 40, and completes the closed circuit through the body diode of Q4 and the body diode of Q5 in the rectifier unit 40.

Figure 11:
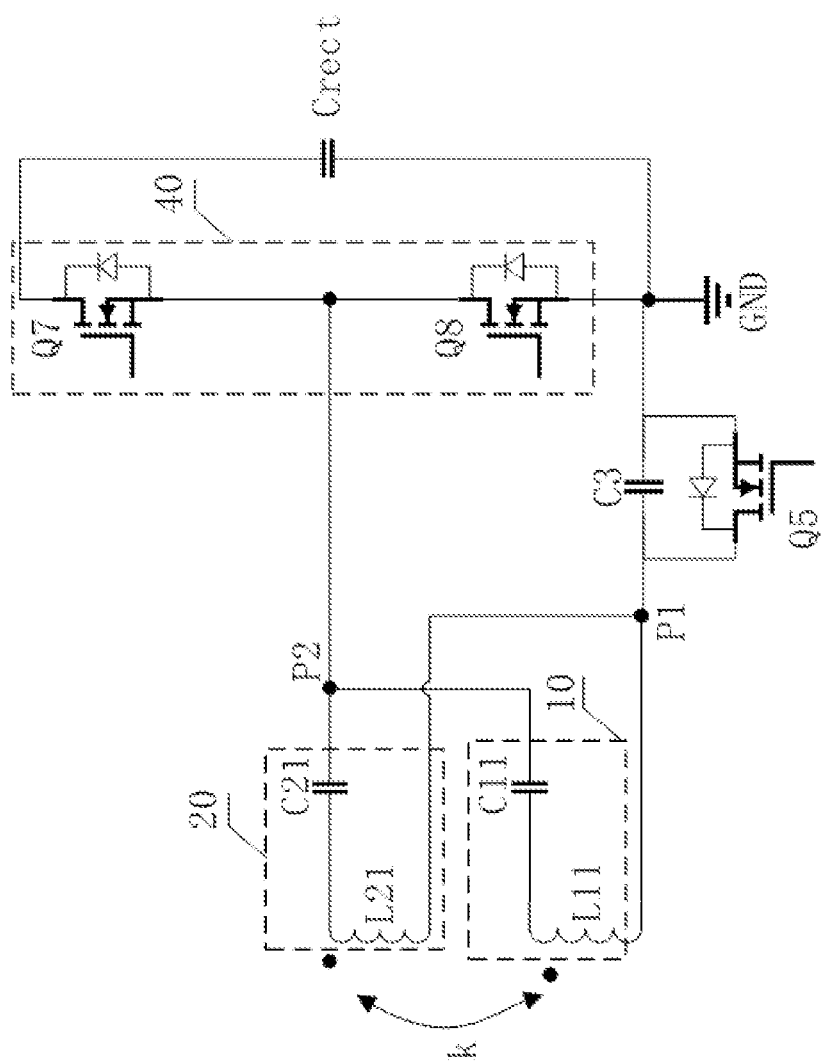
FIG. 11 is a schematic structural diagram of a partial circuit of a charging module provided by another embodiment of the present invention.

Optionally, the rectifier unit 40 may also be a current-type class D rectifier circuit. In this case, the rectifier unit 40 includes a seventh MOSFET and an eighth MOSFET. As shown in FIG. 11, FIG. 11 exemplarily shows that the rectifier unit 40 is a charging module of a current-type Class D rectifier circuit, where the seventh MOSFET corresponds to Q7, and the eighth MOSFET corresponds to Q8.

Specifically, the connection node between the source of Q7 and the drain of Q8 are connected to the second connection node P2. The drain of Q7 is connected to the output terminal of the rectifier unit 40. The source of Q8 and the second terminal of the first capacitor C3 are both grounded, and the gates of Q7 and Q8 are both connected to the control unit 30.

It can be seen that the connection node between Q7 and Q8 is the input of the rectifier unit 40, and Q5 connected in parallel with the first capacitor C3 needs to keep its source grounded. When the charging module is started by receiving the low-frequency wireless power signal through the low-frequency coil L11, at the positive half cycle of the signal (the voltage between the first connection node P1 and the second connection node P2 is negative), the low-frequency induced current on the low-frequency coil L11 passes through the rectifier unit 40 through the body diode of Q1 to charge the output capacitor Crect, and the circuit is completed through the body diode of Q5.

The main advantage of the circuit structure shown in FIG. 11 is that since the source of Q5 is grounded, the driving circuit only needs to reference the ground to output driving signals, which greatly simplifies the driving circuit.

Figure 12:
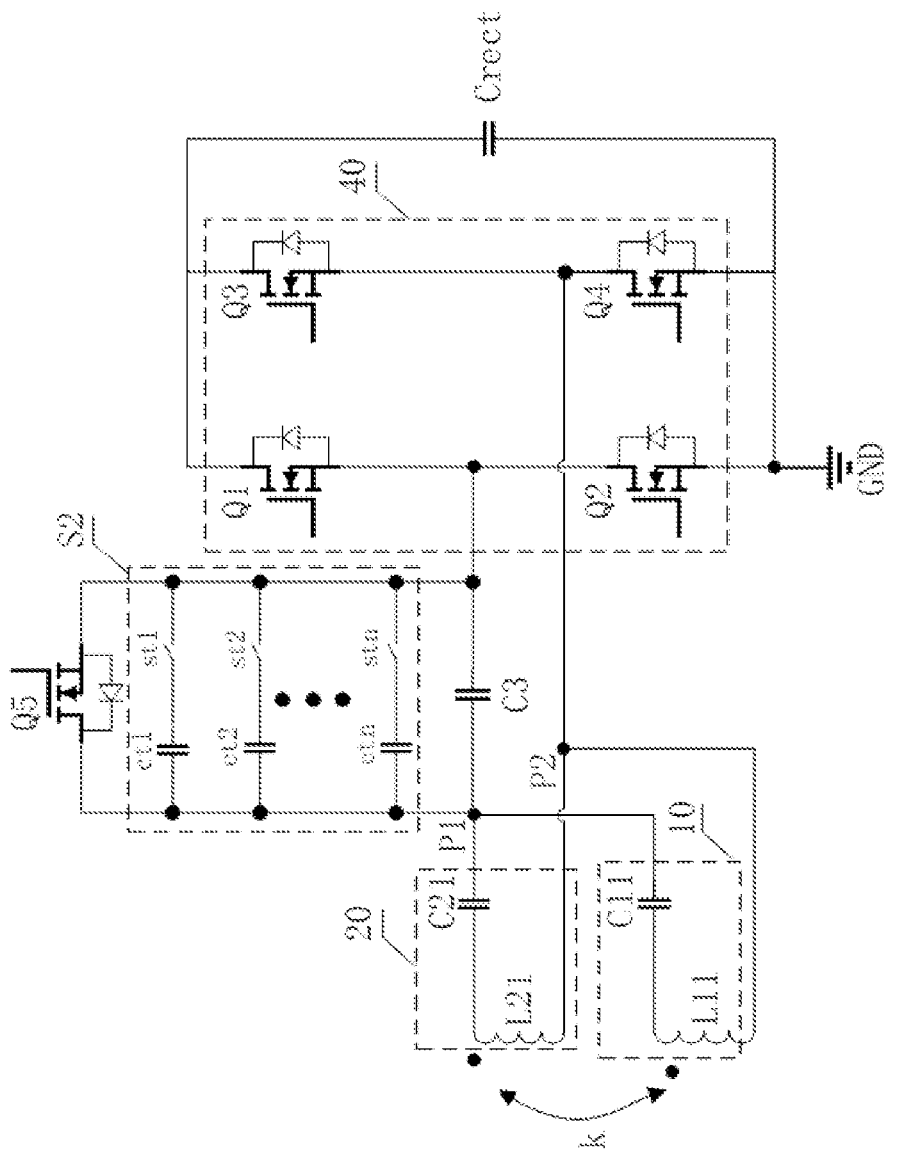
FIG. 12 is a schematic structural diagram of a partial circuit of a charging module provided by another embodiment of the present invention.

In one embodiment, as shown in FIG. 12, the charging module further includes a second switch unit S2. The second switch unit S2 is connected in parallel with the first capacitor C3. The second switch unit S2 is used to adjust the effective capacitance of the first capacitor C3.

Optionally, the second switch unit S2 includes at least one second sub-switch unit and at least one second capacitor, where each one of the second sub-switch unit corresponds to a second capacitor. Specifically, the second sub-switch unit is connected in series with the second capacitor.

As shown in FIG. 12, the second switch unit S2 includes a second sub-switch unit st1, a second sub-switch unit st2, . . . , and a second sub-switch unit stn. Correspondingly, the second switch unit S2 further includes a second capacitor ct1, a second capacitor ct2, . . . , and the second capacitor ctn. Each second sub-switch unit stn is connected in series with the corresponding second capacitor ctn.

Similarly, the on and off of each second sub-switch unit is controlled by the second control signal generated by the control unit 30. The second control signal is a digital signal representing the on-off state of at least one second sub-switch unit. In addition, the second sub-switch unit st1, the second sub-switch unit st2, . . . , and the second sub-switch unit stn may be the same or different. The second capacitor ct1, the second capacitor ct2, . . . , and the second capacitor ctn may be the same or different. There are no restrictions here. For example, the second sub-switching unit st1, the second sub-switching unit st2, . . . , and the second sub-switching unit stn are all the same, and at the same time, the second capacitor ct1, the second capacitor ct2, . . . , and the second capacitor ctn increase in order according to the exponential times of 2.

When the control unit 30 detects that the dual-mode wireless charging receiver receives a high-frequency wireless power signal, that is, when it is operating at a high frequency, Q5 is kept off.

On the one hand, the second control signal can be used to control the on-off combination of the second sub-switch unit st1, the second sub-switch unit st2, . . . , and the second sub-switch unit stn in the parallel circuit with Q5 to realize the control of the first sub-switch unit stn to adjust capacitor C3 in a finer granularity. Dynamic tuning means that when the control unit 30 detects that the resonant frequency of the series circuit composed of the high-frequency resonant unit 20 and the first capacitor C3 deviates from the frequency of the input high-frequency wireless power signal, it changes the conduction state of the at least one second sub-switch to dynamically tune the series circuit composed of the high-frequency resonant unit 20 and the first capacitor C3 to resonance.

Figure 13:
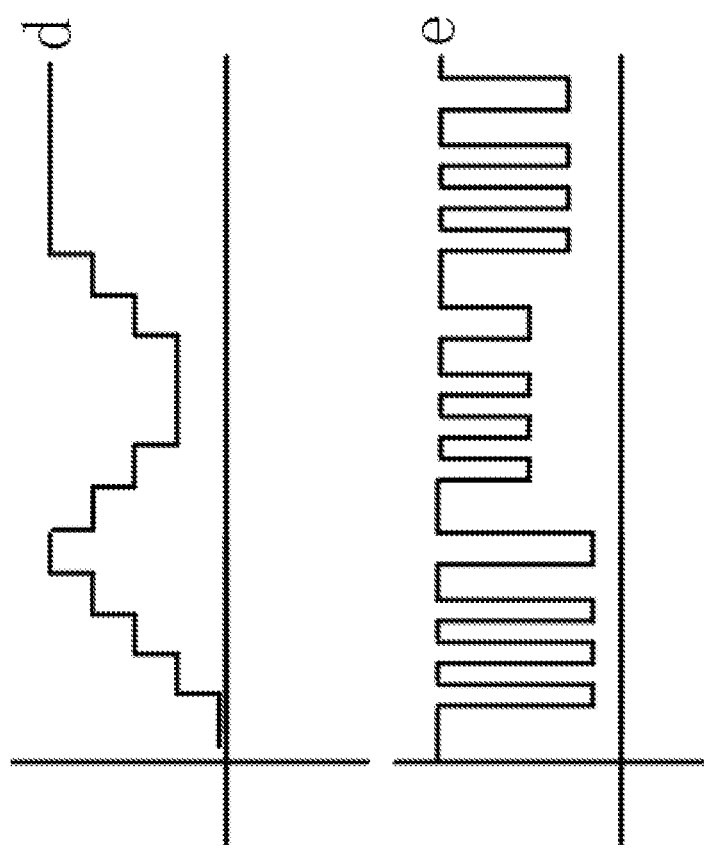
FIG. 13 is a diagram of a second control signal provided by an embodiment of the present invention.

Therefore, the resonance of the high-frequency coil L21 is maintained, and the influence to its resonance due to the change of the surrounding environment where the high-frequency coil L21 is located is overcome. It should be understood that the second sub-switching unit st1, the second sub-switching unit st2, . . . , and the second sub-switching unit stn are controlled by the second control signal (digital signal) generated by the control unit 30. As shown in d of FIG. 13, it is an exemplary diagram of the second control signal output by the control unit 30.

On the other hand, the dynamic tuning of the high-frequency coil L21 can be achieved by controlling the on-off combination of the second sub-switch unit st1, the second sub-switch unit st2, . . . , and the second sub-switch unit stn in parallel with Q5. Dynamic modulation controls the dynamic tuning circuit to switch the high-frequency coil L21 between resonance and non-resonance, thereby realizing the communication between the dual-mode wireless charging receiver and the transmitter. Among them, the on-off of the second sub-switch unit st1, the on-off of the second sub-switch unit st2, . . . , and the on-off of the second sub-switch unit stn are controlled by a digital signal shown in e of FIG. 13. The digital signal is also a pulse width modulation signal.

In addition, more modulation depths can be achieved by controlling the switch in series, so through dynamic and continuous adjustment to achieve multiple different modulation depths and to meet a variety of working conditions. The communication can be carried out smoothly under the coupling conditions of different transmission coils and receiving coils.

At the same time, in the low-frequency operation, a similar method can be used to control the on and off state of the second sub-switch unit st1, the second sub-switch unit st2, . . . , and the second sub-switch unit stn, and at the same time control Q5 to turn off, configuring the low-frequency compensation capacitor C11 to be connected in series with different second capacitors ct1, second capacitors ct2, . . . , and second capacitors ctn to modulate the pulse width modulation signal to be transmitted to the current on the low-frequency coil L21. The amplitude of the modulation can also be adjusted according to the coupling between the transmitter and the receiver to achieve dynamic adjustment of the modulation depth of the amplitude modulation communication.

Further, the second sub-switch unit st1, the second sub-switch unit st2, . . . , and the second sub-switch unit stn may all include a single MOSFET, that is, each second sub-switch unit includes a second MOSFET.

Figure 14:
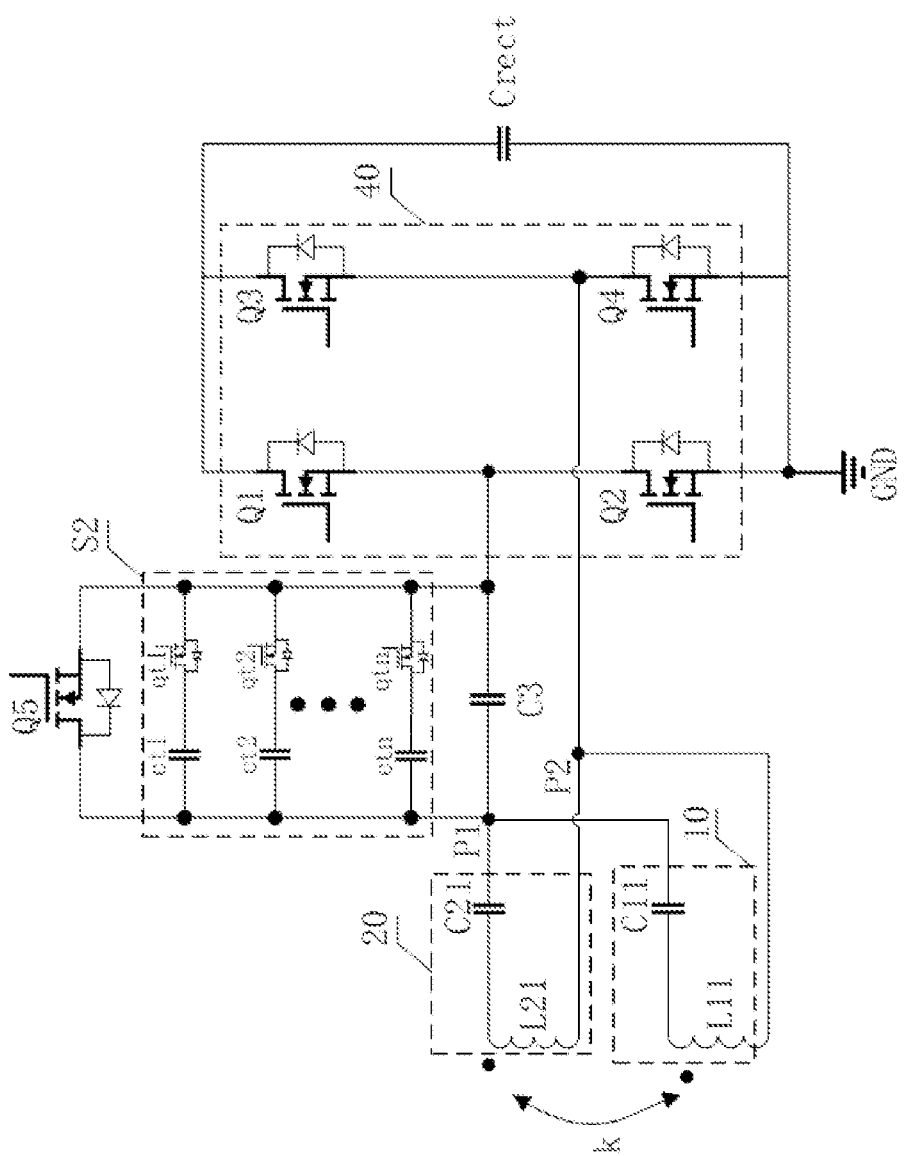
FIG. 14 is a schematic structural diagram of a partial circuit of a charging module provided by another embodiment of the present invention.

As shown in FIG. 14, the second MOSFET in each second sub-switching unit corresponds to MOSFET qt1, MOSFET qt2, . . . , and MOSFET qtn. In other words, the second sub-switch unit st1 includes MOSFET qt1. The second sub-switch unit st2 includes MOSFET qt2, . . . , and the second sub-switch unit stn includes MOSFET qtn. Among them, the source terminals of qt1, qt2, . . . , and qtn are connected to the source of Q5, and the drain terminals of qt1, qt2, . . . , and qtn are respectively connected to the drain of Q5 through a second capacitor. Therefore, the control of the first capacitor C3 can be achieved through a simple MOSFET, and the DC voltage on the first capacitor C3 can be clamped by the body diode of Q5.

The embodiment of the present invention also provides a wireless charging system, which includes a dual-mode wireless charging receiver device and a transmitter device. Among them, the dual-mode wireless charging receiver includes the charging module of any of the above embodiments, and the dual-mode wireless charging receiver is used to be set in an electronic device. The transmitter is configured to supply power to the dual-mode wireless charging receiver when it comes within a preset range of the dual-mode wireless charging receiver, and the transmitter is arranged in the power supply device.

The charging module provided by the present invention includes a low-frequency resonant unit 10, a high-frequency resonant unit 20, a first capacitor C3, a control unit 30, a rectifier unit 40, and a voltage conversion unit 50. The first terminal of the low-frequency resonant unit 10 is connected to the first terminal of the high-frequency resonant unit 20, and the connection node is the first connection node P1. The second terminal of the low-frequency resonant unit 10 is connected to the second terminal of the high-frequency resonant unit 20, and the connection node is the second connection node P2. The low-frequency resonant unit 10 includes a low-frequency coil L11 and a low-frequency compensation capacitor C11 connected in series. The high-frequency resonant unit 20 includes a high-frequency coil L21 and a high-frequency tuning capacitor C21 connected in series, and the doted terminal of the low-frequency coil L11 is connected to the doted terminal of the high-frequency coil L21. The high-frequency tuning capacitor C21 is used to make the difference between the AC voltage (the voltage between P1 and P2) between two terminals of the high-frequency resonant unit 20 when receiving high-frequency wireless power signals and the induced electromotive force between two terminals of the low-frequency coil L11 generated by the current flowing through the high-frequency resonant unit 20 within a preset interval. The first terminal of the first capacitor C3 is connected to the first connection node P1. The second terminal of the first capacitor C3 is connected to the first input terminal of the rectifier unit 40, and the second input terminal of the rectifier unit 40 is connected to the second connection node P2. The output terminal of the rectifier unit 40 is connected to the input terminal of the voltage conversion unit 50. The output terminal of the voltage conversion unit 50 is used to supply power to the subsequent circuit. The first capacitor C3 is used to form a series resonance with the high-frequency coil L21 and the high-frequency tuning capacitor C21 near the high-frequency operating frequency. Through the above method, the operating efficiency of the dual-mode wireless charging receiver can be improved.

Finally, it should be noted that the above embodiments are only used to illustrate the technical solutions of the present invention, not to limit them; under the idea of the present invention, the technical features of the above embodiments or different embodiments can also be combined. The steps can be implemented in any order, and there are many other variations of the different aspects of the present invention as described above. For the sake of brevity, they are not provided in the details; although the present invention has been described in detail with reference to the foregoing embodiments, it is common that the technical personnel should understand that: they can still modify the technical solutions recorded in the foregoing embodiments, or equivalently replace some of the technical features; and these modifications or substitutions do not make the essence of the corresponding technical solutions deviate from the implementations of this application examples of the scope of technical solutions.

What is claimed is:

1. A charging module of a dual-mode wireless charging receiver, the charging mode comprising:
   a low-frequency resonant unit, a high-frequency resonant unit, a first capacitor, a rectifier unit and a voltage converter, wherein:
      a first terminal of the low-frequency resonant unit is connected to a first terminal of the high-frequency resonant unit, and a connection node of the first terminal of the low-frequency resonant unit and the first terminal of the high-frequency resonant unit is a first connection node; and
      a second terminal of the low-frequency resonant unit is connected to a second terminal of the high-frequency resonant unit, and a connection node of the second terminal of the low-frequency resonant unit and the second terminal of the high-frequency resonant unit is a second connection node, and wherein:
   the low-frequency resonant unit includes a low-frequency coil and a low-frequency compensation capacitor connected in series;
   the high-frequency resonant unit includes a high-frequency coil and a high-frequency tuning capacitor connected in series;
   a doted terminal of the low-frequency coil is connected to a doted terminal of the high-frequency coil;
   the high-frequency tuning capacitor is used to make a difference between an AC voltage between the first terminal and the second terminal of the high-frequency resonant unit when receiving high-frequency wireless power signals and an induced electromotive force between the first terminal and the second terminal of the low-frequency coil generated by a current flowing through the high-frequency resonant unit is within a preset interval;
   a first terminal of the first capacitor is connected to the first connection node;
   a second terminal of the first capacitor is connected to a first input terminal of the rectifier unit;
   a second input terminal of the rectifier unit is connected to the second connection node; and
   an output terminal of the rectifier unit is connected to an input terminal of the voltage converter, and an output end of the voltage converter is used to supply power to subsequent circuits, and wherein the first capacitor is used to form a series resonance with the high-frequency coil and the high-frequency tuning capacitor near an operating frequency of the high-frequency wireless power signals.

2. The charging module of claim 1, wherein:
a capacitance of the high-frequency tuning capacitor is:

$$CH = \frac{LH - k\sqrt{LH \cdot LL}}{\omega^2}$$

where CH is a capacitance value of the high-frequency tuning capacitor, LH is an inductance value of the high-frequency coil, LL is an inductance value of the low-frequency coil, and ω is an angular frequency of the high-frequency wireless power signals received by the dual-mode wireless charging receiver, k is a coupling coefficient between the high-frequency coil and the low-frequency coil at the operating frequency of the high-frequency wireless power signals.

3. The charging module of claim 2, wherein:
a capacitance of the first capacitor is:

$$CC = \frac{CH}{\omega^2 LH \cdot CH - 1}$$

where CC is a capacitance value of the first capacitor.

4. The charging module of claim 1, further comprising:
a first switch unit and a control unit, wherein:
   the first switch unit is connected in parallel with the first capacitor; and
   the first switch unit is also connected to the control unit.

5. The charging module of claim 4, wherein the control unit is used to:
detect whether the dual-mode wireless charging receiver receives a low-frequency wireless power signal, and wherein:
   if yes, control the first switch unit to turn on, so that the low-frequency resonant unit transfers the received low-frequency wireless power signal to the rectifier unit; and
   if not, control the first switch unit to turn off, so that the first capacitor is used to form the series resonance with the high-frequency coil and the high-frequency tuning capacitor near the operating frequency of the high-frequency wireless power signals.

6. The charging module of claim 4, wherein:
the first switch unit includes a first MOSFET;
a gate of the first MOSFET is connected to the control unit, and a drain and a source are connected to the first terminal and the second terminal of the first capacitor respectively; and
a state of the first MOSFET is determined by a first control signal of the control unit, and wherein a maximum voltage value of the first control signal is considered as a high level, and a minimum voltage value of the first control signal is considered as a low level.

7. The charging module of claim 6, wherein:
the first control signal is always at the high level or always at the low level; and
the first control signal is used to control a conduction state of the first MOSFET based on a wireless power signal received by the dual-mode wireless charging receiver.

8. The charging module of claim 6, wherein:
the first control signal comprises a plurality of levels continuously changing between the high level and the low level; and
the first control signal is used to change a conduction state of the first MOSFET when the control unit detects an overvoltage or overcurrent event at an input, so as to protect subsequent circuits.

9. The charging module of claim 6, wherein:
the first control signal is a pulse width modulation signal; and
the first control signal is used to modulate an on-resistance of the first MOSFET to realize communication with a transmitter in a manner of load modulation.

10. The charging module of claim 6, further comprising a low-frequency start unit, wherein:
a first terminal of the low-frequency start unit is connected to a first terminal of the first switch unit; and
a second terminal of the low-frequency start circuit is connected to the output terminal of the rectifier unit, and wherein when the charging module is started by receiving a low-frequency wireless power signal through the low-frequency coil, the low-frequency start unit is used to provide power to each unit in the charging module based on the low-frequency wireless power signal received by the low-frequency coil.

11. The charging module in claim 10, wherein:
the low-frequency start unit includes a first diode, and wherein:
a first terminal of the first diode is connected to the first connection node and the first terminal of the first switch unit; and
a second terminal of the first diode is connected to the output terminal of the rectifier unit.

12. The charging module of claim 11, wherein:
the low-frequency start unit further includes a second diode, and wherein:
a first terminal of the second diode is grounded; and
a second terminal of the second diode is connected to the first terminal of the first diode.

13. The charging module of claim 1, further comprising a first switch unit, a control unit, and a second switch unit, and wherein:
the second switch unit is connected in parallel with the first capacitor,
the second switch unit comprises at least one second sub-switch unit and at least one second capacitor, and wherein each of the at least one second sub-switch unit corresponds to a second capacitor;
the at least one second sub-switch unit is connected in series with the second capacitor; and
the second switch unit is used to control a switch state of the at least one second sub-switch unit based on a second control signal of the control unit, so as to adjust an effective capacitance value of the first capacitor.

14. The charging module in claim 13, wherein:
the second control signal is a digital signal representing a conduction state of the at least one second sub-switch unit, and wherein:
when the dual-mode wireless charging receiver receives a high-frequency wireless power signal, a first control signal controls the first switch unit to remain open, and the second control signal is used to change the conduction state of the at least one second sub-switch unit to dynamically modulate a resonance frequency of a series circuit composed of the high-frequency resonant unit and the first capacitor, and wherein the control unit detects that the resonance frequency of the series circuit composed of the high-frequency resonant unit and the first capacitor deviates from a frequency of the high-frequency wireless power signal.

15. The charging module of claim 13, wherein:
the second control signal is a digital signal representing a conduction state of the at least one second sub-switch unit, and wherein:
when the dual-mode wireless charging receiver receives a low-frequency wireless power signal and performs load modulation communication, the first control signal controls the first switch unit to turn off, and the second control signal is used to change the conduction state of the at least one second sub-switch unit to realize a communication between the dual-mode wireless charging receiver and a transmitter by changing the effective capacitance value of the first capacitor.

16. The charging module in claim 15, wherein:
the first switch unit includes a first MOSFET;
a gate of the first MOSFET is connected to the control unit, and a drain and a source of the first MOSFET are connected to the first terminal and the second terminal of the first capacitor respectively; and
the at least one second sub-switch unit includes a second MOSFET, and wherein:
a drain of the second MOSFET is connected to the first terminal of the second capacitor, the second terminal of the second capacitor is connected to the first terminal of the first capacitor, and a source of the second MOSFET is connected to the second terminal of the second capacitor, and the gate of the second MOSFET is connected to the control unit.

17. The charging module of claim 1, further comprising:
a first switch unit and a control unit, wherein:
the first switch unit is connected in parallel with the first capacitor; and
the first switch unit is also connected to the control unit, and wherein:
the rectifier unit includes a third MOSFET, a fourth MOSFET, a fifth MOSFET, and a sixth MOSFET;
a connection node between a source of the third MOSFET and a drain of the fourth MOSFET is connected to the second terminal of the first capacitor, and the connection node between a source of the fifth MOSFET and a drain of the sixth MOSFET is connected to the second connection node;
a drain of the third MOSFET is connected to a drain of the fifth MOSFET and is connected to the output terminal of the rectifier unit;
a source of the fourth MOSFET and a source of the sixth MOSFET are both grounded; and
gate terminals of the third MOSFET, the fourth MOSFET, the fifth MOSFET and the sixth MOSFET are all connected to the control unit.

18. The charging module in claim 1, further comprising:
a first switch unit and a control unit, wherein:
the first switch unit is connected in parallel with the first capacitor; and the first switch unit is also connected to the control unit, and wherein:

the rectifier unit includes a seventh MOSFET and an eighth MOSFET;

a connection node between a source of the seventh MOSFET and a drain of the eighth MOSFET is connected to the second connection node;

a drain of the seventh MOSFET is connected to the output terminal of the rectifier unit;

a source of the eighth MOSFET and the second terminal of the first capacitor are both grounded; and a gate of the seventh MOSFET and a gate of the eighth MOSFET are both connected to the control unit.

19. The charging module of claim 1 further comprising a first switch unit, a control unit and a detector, wherein:

the detector is connected to the rectifier unit and the control unit respectively; and the detector is used to detect a frequency of a wireless power signal received by the dual-mode wireless charging receiver by the rectifier unit, and transmit a detection result to the control unit.

\* \* \* \* \*